(12) United States Patent
Fuchs

(10) Patent No.: US 9,933,208 B2
(45) Date of Patent: Apr. 3, 2018

(54) METHOD AND APPARATUS FOR SEPARATING A LIQUEFIABLE GAS MIXTURE

(71) Applicant: Alfred Fuchs, Bergen (DE)

(72) Inventor: Alfred Fuchs, Bergen (DE)

( * ) Notice: Subject to any disclaimer, the term of this patent is extended or adjusted under 35 U.S.C. 154(b) by 0 days.

(21) Appl. No.: 14/392,215

(22) PCT Filed: Jun. 16, 2014

(86) PCT No.: PCT/EP2014/062575
§ 371 (c)(1),
(2) Date: Dec. 24, 2015

(87) PCT Pub. No.: WO2014/206792
PCT Pub. Date: Dec. 31, 2014

(65) Prior Publication Data
US 2016/0138865 A1     May 19, 2016

(30) Foreign Application Priority Data
Jun. 27, 2013 (AT) .................. A 534/2013

(51) Int. Cl.
| | |
|---|---|
| *F25J 3/00* | (2006.01) |
| *F25J 3/02* | (2006.01) |
| *B01D 53/00* | (2006.01) |
| *F25J 3/04* | (2006.01) |
| *F25J 3/08* | (2006.01) |
| *F25J 1/00* | (2006.01) |

(52) U.S. Cl.
CPC .......... *F25J 3/0257* (2013.01); *B01D 53/002* (2013.01); *F25J 3/04975* (2013.01); *F25J 3/08* (2013.01);
(Continued)

(58) Field of Classification Search
CPC ........ B01D 53/24; B01D 53/77; B01D 53/81; B01D 2256/10; B01D 9/00; B01D 45/12;
(Continued)

(56) References Cited

U.S. PATENT DOCUMENTS

| | | | |
|---|---|---|---|
| 2,062,537 A | 12/1936 | Twomey | |
| 5,305,610 A * | 4/1994 | Bennett | B01D 8/00 62/5 |

(Continued)

FOREIGN PATENT DOCUMENTS

| | | |
|---|---|---|
| CN | 1623074 A | 6/2005 |
| DE | 214264 C | 10/1908 |

(Continued)

OTHER PUBLICATIONS

International Search Report of PCT/EP2014/062575, dated Sep. 24, 2014.
Austrian Search Report in A 534/2013, dated Feb. 17, 2014.

*Primary Examiner* — Keith Raymond
*Assistant Examiner* — Webeshet Mengesha
(74) *Attorney, Agent, or Firm* — Collard & Roe, P.C.

(57) ABSTRACT

The invention relates to a method for separating a liquefiable gas mixture consisting of a plurality of components, comprising at least one first component (K1) and one second component (K2), wherein, under an increased pressure $p_1$, the first component (K1) has a melting point $T^*_{K1}$ that is higher than the melting point $T^*_{K2}$ of the second component (K2). In order to realise a configuration that is as compact as possible, it is provided in accordance with the invention that the method comprises the following steps:
  converting the gas mixture to a liquid state at a temperature $T_0$ and a pressure $p_0$, wherein $T^*_{K2} < T_0 \leq T^*_{K1}$ and $p_0 < p_1$ applies, and wherein the first component (K1) is present in an initial concentration (C0);
  producing a pressure gradient in the liquefied gas mixture, wherein the increased pressure $p_1$ prevails at least in a limited spatial region (3) of the liquefied gas mixture, and freeze separation of the first component (K1) occurs.

7 Claims, 2 Drawing Sheets

(52) U.S. Cl.
CPC ...... *B01D 2256/10* (2013.01); *B01D 2256/12* (2013.01); *F25J 1/0015* (2013.01); *F25J 2205/10* (2013.01); *F25J 2205/20* (2013.01); *F25J 2215/42* (2013.01); *F25J 2215/50* (2013.01); *F25J 2220/44* (2013.01); *F25J 2220/50* (2013.01)

(58) Field of Classification Search
CPC .... F25J 3/04975; F25J 3/0257; F25J 2205/20; F25J 2205/10; F25J 2205/15; F25J 2215/42; F25J 2215/50; F25J 2220/44; F25J 2220/50; B04B 5/08
See application file for complete search history.

(56) References Cited

U.S. PATENT DOCUMENTS

| | | | |
|---|---|---|---|
| 5,476,537 A * | 12/1995 | Yi | B01D 3/14 55/459.4 |
| 5,553,591 A * | 9/1996 | Yi | F02M 25/12 123/585 |
| 6,440,317 B1 * | 8/2002 | Koethe | B01D 17/0217 123/541 |
| 7,325,415 B2 | 2/2008 | Amin et al. | |
| 2004/0026572 A1 * | 2/2004 | Burton | B64G 1/401 244/171.1 |
| 2006/0230933 A1 * | 10/2006 | Harazim | B04B 5/08 95/270 |
| 2008/0307961 A1 * | 12/2008 | Howard | B01D 53/24 95/35 |

FOREIGN PATENT DOCUMENTS

| | | |
|---|---|---|
| DE | 386694 C | 12/1923 |
| GB | 190906515 A | 3/1910 |
| GB | 152643 A | 3/1921 |
| WO | WO 00/47305 A1 | 8/2000 |
| WO | 03/062725 A1 | 7/2003 |

\* cited by examiner

METHOD AND APPARATUS FOR SEPARATING A LIQUEFIABLE GAS MIXTURE

CROSS REFERENCE TO RELATED APPLICATIONS

This application is the National Stage of PCT/EP2014/062575 filed on Jun. 16, 2014, which claims priority under 35 U.S.C. § 119 of Austrian Application No. A 534/2013 filed on Jun. 27, 2013, the disclosures of which are incorporated by reference. The international application under PCT article 21(2) was not published in English.

FIELD OF THE INVENTION

The present invention relates to a method for separating a liquefiable gas mixture consisting of a plurality of components, comprising at least one first component and one second component, wherein, under an increased pressure $p_1$, the first component has a melting point $T^*_{K1}$ that is higher than the melting point $T^*_{K2}$ of the second component.

The present invention also relates to an apparatus for performing the method in accordance with the invention.

DESCRIPTION OF THE PRIOR ART

Separating methods are required in many industrial processes in order to separate mixtures of materials into their components or fractions. Thermal separating methods, i.e. separating methods such as distillation which are based on setting a thermodynamic phase balance, play an especially big role. These separating methods also include methods for gas separation or for separating a gas mixture, especially air. The separation of nitrogen and oxygen is relevant for many industrial processes, e.g. in order to provide the purest possible oxygen for the oxyfuel method for example. The oxyfuel method concerns a combustion method which allows achieving especially high flame temperatures and is suitable as a basis for power plant processes with high energy-saving potential. This is contrasted by the energy input which is required for providing the purest possible oxygen.

The large-scale production of oxygen and the large-scale gas separation usually occurs in a cryogenic manner, according to the Linde method. The air is liquefied at first in the Linde method. Voluminous rectification columns are used for separation, in which liquid air runs downwardly in counterflow to the rising gas via several rectifying trays, wherein the liquefied air absorbs oxygen from the gas and emits nitrogen.

Furthermore, methods are principally known which are based on adsorption and membranes which are only permeable to oxygen but not to nitrogen. These methods also operate in the gas phase, which requires a relatively complex installation setup.

OBJECTIVE OF THE INVENTION

It is the object of the present invention to provide a method for separating a liquefiable gas mixture which allows a more compact configuration than the installation as known from the prior art, thus reducing the complexity of the installation. Furthermore, an apparatus is to be provided for performing the method in accordance with the invention.

DISCLOSURE OF THE INVENTION

In order to enable a more compact configuration in comparison with apparatuses known from the prior art for separating a liquefiable gas mixture, it is provided in accordance with the invention to not carry out the separation in the gas phase, but to utilise the phase transition between liquid and solid. Since the melting enthalpy of substances is typically smaller by one magnitude than their evaporation enthalpy, more rapid kinematics can be achieved in addition to a more compact configuration in comparison with methods according to the prior art, which utilise the phase transition between gaseous and liquid.

The precondition is a liquefiable gas mixture consisting of several atomic or molecular components in (preferably completely) liquefied form, wherein at least one first component must be present which has a melting point $T^*_{K1}$ at a pressure $p_1$, and a second component which at the same pressure $p_1$ has a melting point $T^*_{K2}$ with $T^*_{K2} < T^*_{K1}$. Usually, $p_1$ will be increased over an initial pressure $p_0$ of the liquefied gas mixture such as the ambient pressure for example. For example, liquefied nitrogen has a melting point of approximately 83 K at a pressure of 1000 bars, whereas liquefied nitrogen has a melting point of approximately 65 K at this pressure. At ambient pressure however both nitrogen and also oxygen are liquid at a temperature of 83 K.

The different melting points of the first and second components at increased pressure $p_1$ are now utilised in the respect that at a temperature $T_0$, which lies between the melting points $T^*_{K2}$ and $T^*_{K1}$, the pressure of the liquefied gas mixture is increased to $p_1$ in order to allow the first component to freeze out. Specifically, a pressure gradient is produced in the liquefied gas mixture at $T_0$, so that the pressure $p_1$ prevails in a limited spatial area of the gas mixture in which freeze separation of the first component occurs. The presence of the first component in solid form opens up different possibilities for the convenient separation from the remaining liquefied gas mixture.

In contrast to crystallisation/freeze separation, which is produced by the temperature difference on a wall and requires a detachment of the freeze-separated part from the wall, the application of high pressure for crystallisation/freeze separation allows continuous operation.

It is therefore provided in accordance with the invention in a method for separating a liquefiable gas mixture from several components, comprising at least one first component and one second component, wherein the first component has a melting point $T^*_{K1}$ at an increased pressure $p_1$ which is higher than the melting point $T^*_{K2}$ of the second component, that the method comprises the following steps:

converting the gas mixture to a liquid state at a temperature $T_0$ and a pressure $p_0$, e.g. by liquefying and subsequently cooling the gas mixture, wherein $T^*_{K2} < T_0 \leq T^*_{K1}$ and $p_0 < p_1$ applies, in order to ensure the presence of the first component and the second component in liquid form at a temperature $T_0$ and pressure $p_0$, and wherein the first component is present in an initial concentration;

producing a pressure gradient in the liquefied gas mixture, wherein the increased pressure $p_1$ prevails at least in a limited spatial region of the liquefied gas mixture, and freeze separation of the first component occurs.

Notice must be taken concerning the conversion of the gas mixture to the liquid state with temperature $T_0$ and pressure $p_0$ that it can also be considered to carry out this change in the state in one step.

The initial concentration of the first component relates to the liquefied gas mixture and is stated in percent by weight or volume for example.

In order to enable the convenient and precise setting of a pressure gradient, it is provided in a preferred embodiment of the method in accordance with the invention that the pressure gradient is produced by rotation of the liquefied gas mixture.

In order to provide a possibility for generating the pressure gradient which is cost-effective and simple to implement from a constructional standpoint, it is provided in an especially preferred embodiment of the method in accordance with the invention that the liquefied gas mixture for producing the pressure gradient is situated in a vessel, preferably a tube, which is rotated about a rotational axis, as a result of which the pressure gradient is radially oriented and a pressure lower than $p_1$ is present within a radial distance a from the rotational axis. The rotational axis preferably extends parallel to the longitudinal axis of the tube and lies in the centre of the tube cross-section disposed perpendicularly to the longitudinal axis of the tube. The vessel principally need not be a tube. It can also concern a cup-shaped vessel for example.

In order to exclude air friction in the rotating vessel or tube, the rotating vessel can be arranged within an evacuated vessel and rotate therein.

One possibility to separate the freeze-separated parts of the first component from the remaining liquefied gas mixture is the known centrifuging, wherein preferably the rotating tube is used as a centrifuge. Centrifuging is especially used when the density of the freeze-separated parts of the first component differs from the density of the remaining liquefied gas mixture which contains the second component. In this respect, the density of the freeze-separated parts of the first component will be higher in most cases than the density of the remaining liquefied gas mixture. In this case, the freeze-separated parts of the first component travel radially to the outside in the centrifuge. It is accordingly provided in a preferred embodiment of the method in accordance with the invention that the first component is separated from the second component by centrifuging.

An especially simple and elegant possibility for separating the first component from the second component or from the remaining liquefied gas mixture is achieved when the density of the freeze-separated parts of the first component is lower than the density of the remaining liquefied gas mixture which contains the second component. A radial flow of the freeze-separated parts of the first component occurs in this case to the inside, i.e. in the direction towards the rotational axis, but not to the outside. As already explained above, the pressure within a radial distance a from the rotational axis is lower than $p_1$. Melting of the freeze-separated parts of the first component therefore occurs in the region within the radial distance a from the rotational axis. A liquefied gas mixture is then present in this region, which has a concentration of the first component which is higher than the initial concentration.

A specific example for such behaviour is represented by air with nitrogen as the first component and oxygen as the second component. Frozen nitrogen has a hexagonal crystalline structure with a density of approximately 1.03 g/cm$^3$ at a temperature of approximately 63 K and normal pressure, whereas the density of liquid nitrogen is approximately 1.14 g/cm$^3$ at a temperature of approximately 90 K and normal pressure for example. It is accordingly provided in an especially preferred embodiment of the method in accordance with the invention that the gas mixture concerns air in which the first component concerns nitrogen and the second component concerns oxygen.

The density is obviously a function of the temperature and the pressure, so that the precise value varies accordingly. Consequently, liquid oxygen has a density of approximately 1.24 kg/l at approximately 70 K and normal pressure, as a further example. It is obviously the case that the freeze separation of the first component or the nitrogen generally does not lead to completely pure crystals. The concentration of the first component in the crystals is obtained according to the underlying phase diagram. Similarly, the crystals of the first component or the nitrogen are generally not present in a liquid which purely consists of the second component or oxygen. This means that the aforementioned density values or the density values of the pure substances are only provided for orientation. The actual density values of the nitrogen crystals or the crystals of the first component and the remaining gas mixture which is still liquid will deviate slightly from these values.

In order to move the density of the still liquid gas mixture closer to the value for the pure liquid second component, the liquid gas mixture which is enriched with the second component and is obtained by separation can be recirculated. In the aforementioned case of the application of the method in accordance with the invention to air, the density of the gas mixture that remains liquid can therefore be moved closer to that of liquid oxygen, in that the mixture which is obtained by separation and enriched with oxygen is recirculated, i.e. it is supplied again to the gas mixture that has remained liquid.

According to the phase diagrams relating to the structure of nitrogen and oxygen as a function of temperature and pressure, it is provided in a preferred embodiment of the method in accordance with the invention that the following applies: 65 K$\leq T_0 \leq$80 K, preferably 70 K$\leq T_0 \leq$75 K. It is further provided in an especially preferred embodiment of the method in accordance with the invention that the following applies: 20 bars$\leq p_1 \leq$2700 bars, preferably 20 bars$\leq p_1 \leq$1000 bars. The initial pressure $p_0$ is lower in any case than $p_1$ and will usually be the ambient or normal pressure.

Although air contains further components, it only contains a fraction thereof which is negligible for the functioning of the method in accordance with the invention. This means that the density of the remaining liquefied gas mixture in which the freeze-separated nitrogen crystals float, i.e. the freeze-separated parts of the first component, is substantially determined by the density of the liquid oxygen, i.e. the second component. That is why it is provided in a preferred embodiment of the method in accordance with the invention that the gas mixture is selected in such a way that the first component belongs to a first, group of substances, the second component belongs to a second group of substances, the substances of the first group are freeze-separated at a temperature $T_0$ and a pressure $p_1$, and the substances of the second group remain liquid, wherein the freeze-separated substances of the first group have a lower density than the substances of the second group which remain liquid. Especially when the gas mixture only consists of the first and the second component or when the fraction of further components is negligible, it can be ensured by this selection that the freeze-separated parts of the first component travel in the direction of the rotational axis and are molten again in the region with radial distance a from the rotational axis in which a pressure lower than $p_1$ prevails.

Since the liquefied gas mixture has a concentration of the first component which is increased over the initial concentration in the region within the radial distance a from the rotational axis, separation can occur by discharging the liquid gas mixture from this region. It is therefore provided in a preferred embodiment of the method in accordance with the invention that the liquefied gas mixture is discharged along a region including the rotational axis in which a concentration of the first component is present which is increased over the initial concentration. This includes the possibility that even partly liquefied gas mixture, including freeze-separated parts of the first component, is discharged from outside of the aforementioned region which is determined by the radial distance a. Preferably, precisely everything from the region determined by the radial distance a should be discharged if possible and as little as possible from outside of this region.

The discharging is simplified in that the method is carried out while the liquefied gas mixture flows axially through the used vessel or tube. That is why it is provided in a preferred embodiment of the method in accordance with the invention that the liquefied gas mixture flows through the vessel parallel to the rotational axis.

An inner tube with a clear internal diameter of preferably precisely 2*a can be arranged for discharging, which inner tube is arranged centrally within the vessel for example. It is obviously also possible to consider smaller or greater clear internal diameters, according to the information provided above. That is why an apparatus in accordance with the invention is provided for carrying out the method in accordance with the invention, comprising:

a vessel, especially a tube, for accommodating the liquefied gas mixture at temperature $T_0$ and pressure $p_0$, wherein the vessel is rotatable about a rotational axis in order to produce a radially oriented pressure gradient in the liquefied gas mixture, and wherein the liquefied gas mixture can flow through the vessel parallel to the rotational axis;

an inner tube arranged within the vessel for discharging the liquefied gas mixture, wherein the inner tube has a clear cross-section, and the clear cross-section covers a region including the rotational axis.

The use of a rotating vessel or tube additionally offers a simple possibility to locally integrate or couple rotating consumers.

It is principally also necessary that the component which remains radially further to the outside needs to be discharged. In the case of the decomposition of air this would be the liquid oxygen or the liquid mixture enriched with oxygen. An inner tube can also be used for this purpose for example.

In the case of air as the gas mixture be separated, freeze separation or crystallisation of argon occurs at normal pressure already at approximately 84 K, wherein the frozen argon, with approximately 1.8 g/cm³, has a higher density than the remaining liquefied gas mixture, especially the liquid oxygen. In the rotating vessel/tube, which also acts as a centrifuge, the argon crystals therefore travel to the outside. In order to finally promote the discharge of the argon crystals, it is provided in a preferred embodiment of the apparatus in accordance with the invention that the vessel has a cross-section along the rotational axis which has a conical shape at least in sections. It supports an axial movement of the argon crystals, i.e. parallel the rotational axis, to an outlet in the jacket of the vessel or the tube.

It is understood that the method in accordance with the invention can be repeated several times successively in order to increase the purity of the obtained components, or that several apparatuses in accordance with the invention can be switched in succession.

In the case of air with nitrogen as the first component and oxygen as the second component, a certain limitation arises for the maximum achievable oxygen fraction in the liquefied gas mixture. This limitation is caused by the phase diagram of the nitrogen-oxygen mixture, which has a eutectic at approximately 25% nitrogen content and approximately 75% oxygen content.

BRIEF DESCRIPTION OF THE DRAWINGS

The invention will be explained below in closer detail by reference to the embodiments. The drawings are exemplary and, although they explain the concept of the invention, they shall not limit said concept in any way or finally represent the same, wherein.

DETAILED DESCRIPTION OF THE PREFERRED EMBODIMENTS

Figure 1:
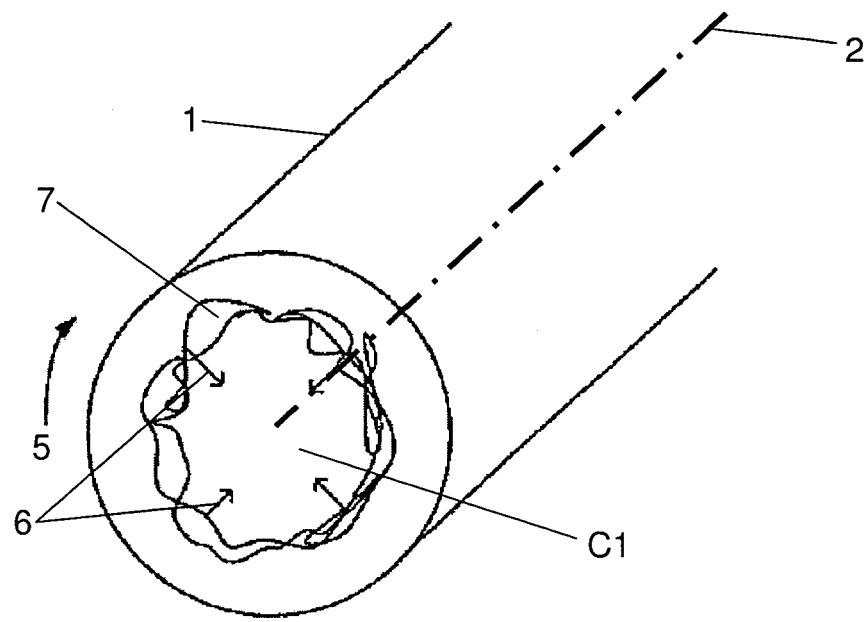
FIG. 1 shows a schematic axonometric sectional view of a rotating tube for producing a pressure gradient of a liquefied gas mixture situated in the tube.

FIG. 1 shows a schematic view of an apparatus in accordance with the invention, comprising a tube 1 with a clear radius R (see FIG. 2), in which tube 1 there is situated a liquefied gas mixture, preferably liquefied air. The liquefied gas mixture has a pressure $p_0$ at first which preferably corresponds to the ambient pressure and is cooled to a temperature $T_0$.

The liquefied gas mixture comprises a first component K1 and a second component K2, which are both liquid at the pressure $p_0$ and temperature $T_0$. The first component K1 is present in the liquefied gas mixture with an initial concentration C0.

The first component K1 has a melting point $T^*_{K1}$ at a pressure $p_1$ which is increased over $p_0$. The second component has a melting point $T^*_{K2}$ at the same pressure $p_1$, wherein $T^*_{K2} < T^*_{K1}$.

In the case of liquefied air, nitrogen forms the first component K1 and oxygen the second component K2. At a pressure $p_1 = 1000$ bars, nitrogen has a melting point $T^*_{K1}$ of approximately 83 K and oxygen a melting point $T^*_{K2}$ of approximately 65 K.

$T_0$ lies between $T^*_{K2}$ and $T^*_{K1}$. In the case of liquefied air, $T_0$ can be selected between 65 K and 80 K, preferably between 70 K and 75 K.

Tube 1 now rotates about a centrally arranged rotational axis 2 with a direction of rotation 5, as a result of which the liquefied gas mixture situated in the tube 1 is rotated. A pressure gradient is thus produced in the liquefied gas mixture in tube 1, which pressure gradient faces radially away from the rotational axis 2, i.e. the pressure increases continuously to the outside starting from the rotational axis 2. As a result, a pressure rise to the pressure $p_1$ at the temperature $T_0$ occurs in a limited spatial area 3 of the liquefied gas mixture.

Figure 2:
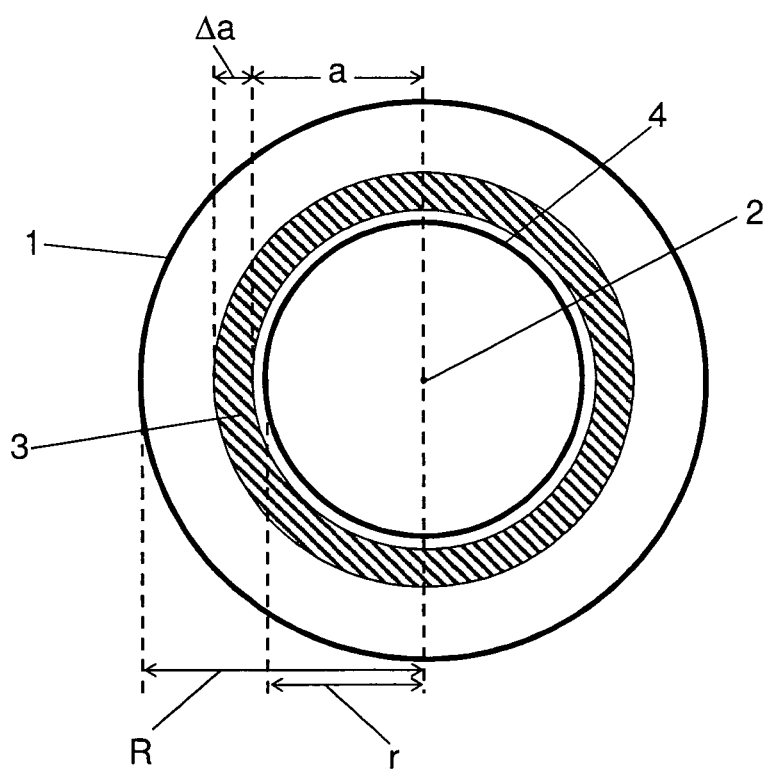
FIG. 2 shows a schematic sectional view of the tube of FIG. 1, but with an inner tube arranged in the tube.

Said limited spatial area 3 is shown in FIG. 2, which shows a schematic sectional view of the tube 1, in an interval of the radial distance of the rotational axis 2 from a to a+Δa. Δa is assumed to be so small that a constant pressure $p_1$ is assumed substantially in the entire region 3. There is a pressure less than $p_1$ in a region around the rotational axis 2 which has a radial distance of less than a.

By selecting the rotational speed of the tube 1, the pressure gradient or the pressure can be set in a controlled manner in a specific spatial region of the liquefied gas mixture within the tube 1. The pressure $p_1$ of a proximally 1000 bars is present for example in a tube 1, which rotates at a velocity of 18,000 rpm and is filled with liquid air, at a radial distance of a=24 cm from the rotational axis 2.

This leads to freeze separation of the first component K1 or freeze separation/crystallisation of nitrogen in the region 3, but principally obviously also outside thereof, i.e. at a radial distance greater a.

If the freeze-separated parts of the first component K1 have a density greater than that of the remaining liquefied gas mixture, said parts in the rotating tube 1 will travel to the outside because the rotating tube 1 acts as a centrifuge, i.e. these frozen parts of the first component K1 can be removed in the known manner by centrifuging.

FIG. 1 shows the case however in which the freeze-separated parts of the first component K1 have a lower density than the remaining liquefied gas mixture. One example for this is frozen nitrogen in liquefied air. The lower density of the freeze-separated parts of the first component K1 or the nitrogen crystals leads to the consequence that a radial flow 6 of the freeze-separated parts of the first component K1 or nitrogen crystals is obtained in relation to the rotational axis 2.

In order to structure the flow conditions in the tube 1 for avoiding imbalance, guide elements (not shown) can be provided within the tube 1. The flow channelled in this manner can lead to evening out of the process described below.

Once the freeze-separated parts of the first component K1 have left the region 3 and have radial distances from the rotational axis 2 which are less than a, they are subjected to pressures which are lower than $p_1$. At a sufficiently low pressure which is lower than $p_1$, melting of the freeze-separated parts of the first component K1 occurs. A liquefied gas mixture with an increased concentration C1 of the first component K1 can consequently be found within a region around the rotational axis 2 with radial distances lower a.

The unbroken serpentine lines in FIG. 1 indicate a transitional zone 7, in which the freeze-separated parts or nitrogen crystals are molten down and are "mushy".

For the purpose of separating the components K1, K2, the liquefied gas mixture with the increased concentration C1 of the first component K1 can be discharged from the region around the rotational axis 2 with radial distances smaller than a. As is schematically shown in FIG. 2, this can occur by means of an inner tube 4, which in the illustrated embodiment is arranged centrically within the tube 1. The inner tube 4 has a clear radius r and a respective circular clear cross-section. With its clear cross-section, the inner tube 4 therefore covers a region which includes the rotational axis 2.

While the liquefied gas mixture flows through the tube 1 axially or parallel to the rotational axis 2, it is merely necessary for discharging the liquefied gas mixture with increased concentration C1 of the first component K1 to arrange the inner tube 4 in the tube 1 as described above.

In order to ensure that no freeze-separated parts of the first component K1 or no nitrogen crystals need to be discharged by the inner tube 4, the clear radius r is chosen smaller than a in the embodiment of FIG. 2.

Figure 3:
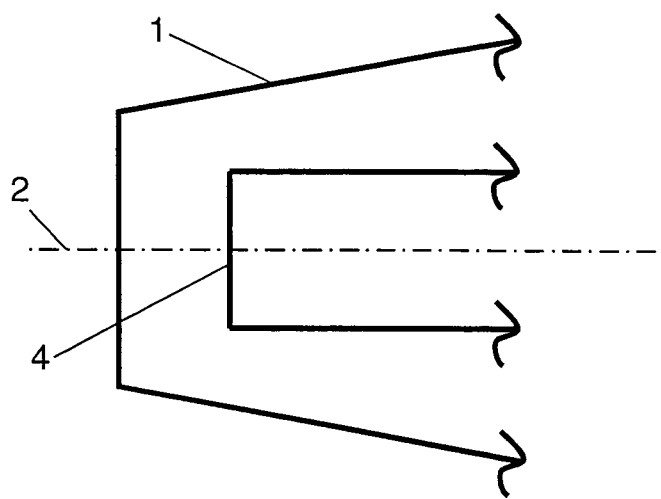
FIG. 3 shows a design variant similar to FIG. 2, but with a conical cross-section of the tube along the rotational axis.

FIG. 3 shows a schematic sectional view of a further embodiment of the apparatus in accordance with the invention for carrying out the separating method in accordance with the invention. In this case, the cross-section of the tube 1 along the rotational axis 2 has a conical shape. As already mentioned above, the crystals or freeze-separated parts of a component of the liquefied gas mixture with a density greater than that of the remaining liquefied gas mixture in the rotating tube moves in the rotating tube 1 radially to the outside, away from the rotational axis 2. The conical shape promotes the movement component of said crystals or freeze-separated parts parallel to the rotational axis 2 towards an outlet (not shown) in the jacket of the tube 1. One example for such crystals are argon crystals, which occur in the separation of liquefied air in accordance with the invention because argon has a higher melting point than nitrogen and oxygen.

LIST OF REFERENCE NUMERALS

1 Tube
2 Rotational axis
3 Limited spatial region
4 Inner tube
5 Direction of rotation
6 Radial flow
7 Transitional zone
K1 First component of a gas mixture
K2 Second component of the gas mixture
C0 Initial concentration
C1 Increased concentration
R Clear radius of the tube
r Clear radius of the inner tube

The invention claimed is:

1. A method for separating a liquefiable gas mixture comprising a plurality of components, the plurality of components comprising at least one first component and one second component,
  wherein, under an increased pressure, the first component has a first component melting point that is higher than a second component melting point of the second component, wherein the liquefiable gas mixture comprises air, the first component comprises nitrogen and the second component comprises oxygen;
  wherein the method comprises the following steps:
  converting the liquefiable gas mixture to a liquid state at a first temperature and a first pressure so that a liquefied gas mixture is formed, wherein the second component melting point <the first temperature ≤the first component melting point and the first pressure <the increased pressure, in order to ensure the presence of the first component and the second component in liquid form at the first temperature and the first pressure, and wherein the first component is present in an initial concentration; and
  producing a pressure gradient in the liquefied gas mixture by rotating the liquefied gas mixture in a vessel about a rotational axis such that the pressure gradient is radially oriented, wherein the increased pressure prevails at least in a limited spatial region of the liquefied gas mixture and a pressure less than the increased pressure is present within a radial distance from the rotational axis, and freeze separation of the first component occurs due to the increased pressure;
  wherein the first component belongs to a first group of substances and the second component belongs to a second group of substances;
  wherein the substances of the first group freeze out at the first temperature and the increased pressure;
  wherein the substances of the second group remain liquid at the first temperature and the increased pressure;
  wherein the freeze-separated substances of the first group have a lower density than the substances of the second group that remain liquid;

wherein the liquefied gas mixture is discharged along a region including the rotational axis; and wherein in the region the first component has an increased concentration as compared to the initial concentration.

2. The method according to claim 1, wherein the vessel is a tube.

3. The method according to claim 1, wherein the first component is separated from the second component by centrifuging.

4. The method according to claim 1, wherein the liquefied gas mixture flows through the vessel parallel to the rotational axis.

5. The method according to claim 1, wherein 65 K ≤ the first temperature ≤ 80 K applies.

6. The method according to claim 1, wherein 20 bars ≤ the increased pressure ≤ 2700 bars applies.

7. The method according to claim 1, wherein the liquefiable gas mixture is converted to the liquid state at the first temperature and the first pressure via liquefying and subsequently cooling the liquefiable gas mixture.

* * * * *